United States Patent
Deng et al.

(10) Patent No.: US 10,621,154 B2
(45) Date of Patent: Apr. 14, 2020

(54) IDENTIFYING PATTERNS OF A SET OF SOFTWARE APPLICATIONS

(71) Applicant: International Business Machines Corporation, Armonk, NY (US)

(72) Inventors: Yu Deng, Yorktown Heights, NY (US); Theodor Razvan Ionescu, Bucharest (RO); Simon J. Kofkin-Hansen, Cary, NC (US); Ruchi Mahindru, Elmsford, NY (US); Christopher Moss, Carlton (AU); Harigovind Venkatraj Ramasamy, Ossining, NY (US); Soumitra Sarkar, Cary, NC (US); Richard Christopher Smith, Lutz, FL (US); Long Wang, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 733 days.

(21) Appl. No.: 14/985,557

(22) Filed: Dec. 31, 2015

(65) Prior Publication Data

US 2017/0193021 A1    Jul. 6, 2017

(51) Int. Cl.
*G06F 17/30* (2006.01)
*G06F 16/22* (2019.01)
(Continued)

(52) U.S. Cl.
CPC ............ *G06F 16/2228* (2019.01); *G06F 8/63* (2013.01); *G06F 16/93* (2019.01); *G06Q 10/06* (2013.01)

(58) Field of Classification Search
None
See application file for complete search history.

(56) References Cited

U.S. PATENT DOCUMENTS 7,188,335 B1 * 3/2007 Darr .................. G06F 8/10
717/104
7,386,839 B1   6/2008 Golender et al.
(Continued)

OTHER PUBLICATIONS

Mahler, A., et al., "shape—a Software Configuration Management Tool", System Configuration Management 1988, Jan. 27-29, 1988, pp. 1-16.

(Continued)

*Primary Examiner* — Tuankhanh D Phan
(74) *Attorney, Agent, or Firm* — Fleit Intellectual Property Law; Jon Gibbons

(57) ABSTRACT

A mechanism is provided for identifying patterns of a set of software applications instances from their documents. The computer-implemented method begins with constructing different attribute vector types using a knowledge ontology. The knowledge ontology captures semantics based on keywords associated with resource attributes derived from one or more documents related to at least a portion of these software application instances. A knowledge base is built from the attribute vector types and the documents of these application instances. These are merged into the knowledge base with the knowledge base previously built from previous software application instances. Analytics are performed on the knowledge base to identify at least one of common patterns of deployments, configurations, or other attribute vector types, or a combination thereof.

20 Claims, 7 Drawing Sheets

(51) Int. Cl.
*G06F 16/93* (2019.01)
*G06F 8/61* (2018.01)
*G06Q 10/06* (2012.01)

(56) References Cited

U.S. PATENT DOCUMENTS

| | | |
|---|---|---|
| 8,886,777 B2 | 11/2014 | Salsbrug |
| 2009/0070129 A1 | 3/2009 | Inbar et al. |
| 2010/0318609 A1 | 12/2010 | Lahiri et al. |
| 2014/0164607 A1* | 6/2014 | Bai .................. H04L 43/045 709/224 |
| 2015/0325000 A1* | 11/2015 | Sripada ............. G06K 9/00718 382/103 |
| 2016/0188730 A1* | 6/2016 | Delli Santi ......... G06F 16/9535 707/728 |

OTHER PUBLICATIONS

Zellner, A., et al., "Bayesian Specification Analysis and Estimation of Simultaneous Equation Models Using Monte Carlo Methods", Journal of Econometrics, May-Jun. 1988, pp. 1-34, vol. 38, Issue 1.

Tsai, J., et al., "A Hybrid Knowledge Representation as a Basis of Requirement Specification and Specification Analysis", IEEE Transactions on Software Engineering, Dec. 1992, pp. 1073-1100, vol. 18, No. 12.

Oracle—"Deliver Private Enterprise Cloud Up to 10X Faster", https://www.oracle.com/cloud/private-cloud.html?sckw=srch:Private_Cloud&mkwid=swQJVAhnz|pcrid|69227248635|pkw|private%20cloud|pmt|e|pdv|c, last accessed on Dec. 24, 2015, pp. 1-3.

* cited by examiner

| DATABASE INSTANCES | | | |
|---|---|---|---|
| DESCRIPTION | ENVIRONMENT | HOST SERVER(S) | APACHE CONFIG. |
| ORACLE SERVER | QA | | OS/VERSION NUMBER |
| | PROD | | HTTP PORT |
| | DR | | SSL PORT |
| | | | APACHE VERSION |
| | | | APP HOME |
| | | | APPCONTENT |
| | | | APPBIN |
| | | | APPLOGS |
| | | | Username |
| | | | Groupname |
| | | | Hostname (Add IP Addresses for all interface |
| | | | Apache Build (Apache Template – 1, 2, or 3) |
| | | | weblogic plugin config |
| | | | context root |
| | | | weblogic cluster |
| | | | WebGate Configuration (if required) |

| DESCRIPTION | ENVIRONMENT | HOST SERVER(S) |
|---|---|---|
| IIS VERSION 7.5 | DEV | |
| | QA | |
| | PROD | |
| | PROD | |
| | DR | |
| ORACLE CLIENT | DEV | |
| | QA | |
| | QA | |
| | PROD | |
| | PROD | |
| | PROD | |
| | DR | |
| | DR | |
| MICROSOFT IIS SERVER WITH A NOT | DEV QA | |
| | PROD | |
| | DR | |
| MS OFFICE | DEV QA | |
| | PROD | |
| | QA | |

FIG. 1

IDENTIFYING PATTERNS OF A SET OF SOFTWARE APPLICATIONS

BACKGROUND

The present application generally relates computing analytics, and more specifically to identify patterns for use by computing analytics in order to identify patterns to consolidate the number of software applications in an enterprise environment or to migrate software applications to a hosted environment.

Hosted environments, as known as cloud computing, is becoming a most popular platform for hosting enterprise applications because the cloud platform consolidates the computing machines, greatly increases resource utilization, and facilitates management of machines, resources, and services. Many large enterprises and organizations are moving their applications into private cloud, where the service catalog, machine templates, cloud services operation workflows, and/or other cloud features can be tailored to the specific requirements of the applications.

However, consolidation of machines into physical resources alone is not sufficient for migrating the applications into cloud. For example, a large company or organization has typically hundreds or thousands of applications, and many of them have their own deployment topology and configuration of certain important middleware including database server, application server, and web server. Before the applications are moved into cloud these applications including the middleware are usually maintained by separate owner teams of the applications, and require a lot of maintenance people. But in cloud platforms, templates of machines and important middleware, e.g. service catalogs and prepared machine images, are used for provisioning of machines, middleware and applications. So there is a need to consolidate, or standardize, the large number of applications' deployment topology and configuration into a small number of templates, so that the templates can be placed in the service catalog of the cloud platforms. The standardization of application deployment and configuration allows the cloud provider or cloud administrators to manage large number of existing applications and provision new applications through cloud services and operations (e.g. services of provisioning, security, conformance, auto-scaling, monitoring, and disaster recovery).

Currently this standardization task is done manually by collaboration of application owners and the cloud provider. It requires experts of the cloud and the application owners to sit together and discuss what templates of deployments and configurations should be used. This manual procedure is very time-consuming, labor-intensive, and error-prone.

Further, cloud systems support to provisioning and management of enterprise applications can be provided in infrastructure level (Infrastructure-as-a-Service, IaaS) or software level (Software-as-a-Service, SaaS). In an IaaS cloud, the installation, deployment and configuration of the application software components, such as web server, application server, database, are users' responsibility, and the cloud only provides services of provisioning virtual machines or containers.

In a private cloud which is dedicatedly designed and implemented for a large enterprise or organization, IaaS is not sufficient and the SaaS capability of provisioning and managing software instances of enterprise applications is highly preferred (our experience with customers shows that "automating the last mile" is a typical requirement for a private cloud).

The cloud service catalog in such a private cloud usually comprises a number of templates for certain software and/or software combinations besides a number of templates for virtual machines. Different templates can involve different software or software combinations, or involve the same software with different configurations.

Using IBM DB2 server as an example: the cloud service catalog designer can offer 4 predefined DB2 configurations—platinum, gold, silver and bronze. The DB2 server has hundreds of configuration parameters. The four catalog entries will correspond to DB2 server configurations with four sets of configuration parameter settings. When an enterprise has hundreds of applications using the DB2 server, it is not convenient for the cloud managers to provide and manage hundreds of DB2 server templates in the cloud catalog; instead, it is much more preferred to identify 4 (or slightly more) DB2 configurations and provide the small number of DB2 server templates for the hundreds of applications.

In the current best practice of private cloud implementation this is usually done manually by experts. The manual approach is very costly and takes very long time as migrating enterprise applications into a private cloud for a large enterprise usually involves many such tasks of identifying common software combinations and software configurations. Automating the pattern identification will greatly facilitate the setup of private cloud platforms for large enterprises.

SUMMARY

Described is a system, computer program product, and method describes an analytics-based solution that analyzes deployments and configurations of existing enterprise applications and identifies a small number of common patterns of the applications. Then the service catalog and machine image templates can be designed for supporting these patterns. In this implementation patterns are defined as logical description of physical and virtual assets as well as their configurations that comprise an enterprise application. The pattern captures multi-tiered application components, such as, database software, application server, and web server. The pattern further captures middleware clustering settings, such as, standalone database or cluster database, and key configuration variables/values of each middleware.

The system parses existing application specifications or build sheets, and constructs a knowledge base. Next analytics technology is applied. Machine learning techniques and/or clustering techniques are used over the knowledge base to identify the common patterns. The solution allows the patterns to be identified without need of involvement of cloud experts or application owner teams.

This tool has been implemented and applied in the field with great success. The tool helps to identify hundreds of applications to migrate into a private cloud. The present invention is the first solution that applies analytics to identify the patterns of enterprise applications in an automated way, for designing the standard service catalog and machine images in the private cloud.

In one example, disclosed is a system, a computer program product and method for identifying patterns of a set of software applications instances from their documents. The computer-implemented method begins with constructing different attribute vector types using a knowledge ontology. The knowledge ontology captures semantics based on keywords associated with resource attributes derived from one or more documents related to at least a portion of these software application instances.

Next, a knowledge base is built from the attribute vector types and the documents of these application instances. These are merged into the knowledge base which was previously built from previous software application instances. Analytics are performed on the knowledge base to identify at least one of common patterns of deployments, configurations, or other attribute vector types, or a combination thereof.

BRIEF DESCRIPTION THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is a sample software application document;

DETAILED DESCRIPTION

Figure 2:
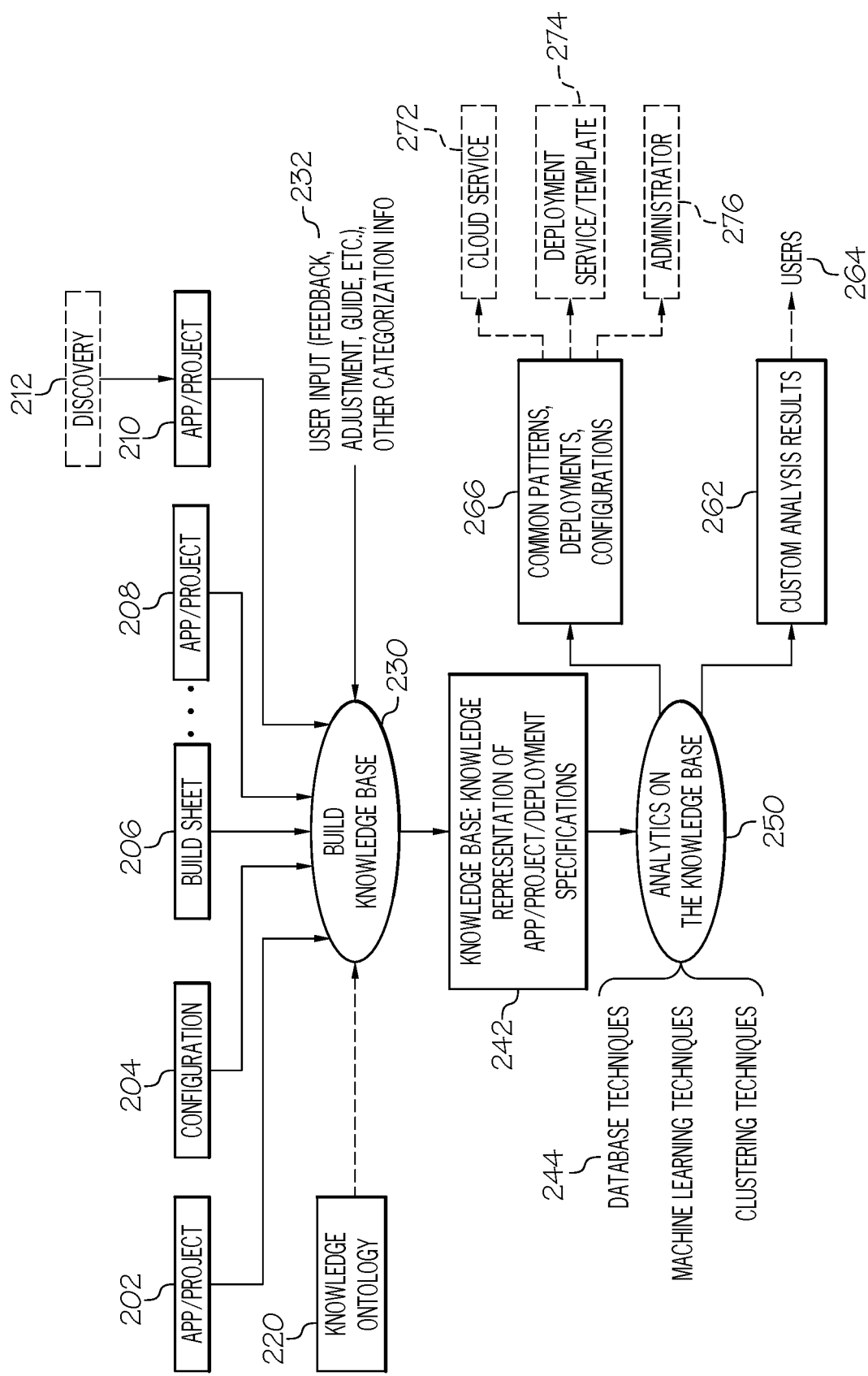
FIG. 2 is a functional diagram of the overall methodology of the pattern identification.

The present invention assists with both standardizing and consolidating configurations for helping non-cloud applications move into cloud. This may be in the form a cloud service catalog that provisions or deploys applications. The configuration standardization is manually applied in the state-of-the-art practice and literature.

Unlike other approaches, the present invention is not a 1-to-1 mapping from source to target, but based on knowledge and analytics on multiple current and past applications and deployments from many software installations.

Non-Limiting Definitions

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

The term "attribute vector" is used to mean a quantity of a collection of concepts and their relationships based on characteristics or features or categories.

The term "knowledge ontology" is used to mean a collection of concepts and their relationships.

The term "semantic" is used to mean a relationship between objects in an ontology that specify how objects are related to other objects.

Overview

The present invention is based on the understanding that most of enterprise applications and systems are well documented by the enterprises and organizations. Although these documents have different names in different enterprises, e.g. build sheets, application specification, solution design, etc., these documents maintain the specific information of the applications, including the name and version of the software used in the applications, operating systems and hardware of the machines where these applications are hosted, the network and firewall information, specific configuration of the component software, relevant user roles, as well as associated management services for the applications, such as backup, load balancing, and more. Moreover, various discovery tools can be applied to obtain the application documents if the enterprise/organization does not have well-maintained documents. FIG. 1 is a sample software application document. The private data is masked. Shown is an instance of database environment 102, descriptions of third-party software instances 104 for deployment attribute vector type, and an Apache server instance 106 for a configuration attribute vector type.

Overall Build Knowledge Base

Turning now to FIG. 2 is a functional diagram of the overall methodology of the pattern identification. The first step is to build a knowledge base from the documents of applications and systems. Shown are documents being used from applications and projects 202, 208, and 210. The optional discovery 212 can use Analytics for Logical Dependency Mapping (ALDM), Darwin Information Typing Architecture (DITA), or a combination thereof for creating documents from application and projects. Other configuration standardization used for migration, replication, and transplantation of granularity of virtual machines may be used.

Also shown are configuration files 204 and build sheets 206. The knowledge base consists of attribute vectors of the applications and systems extracted from the documents this is shown as the knowledge representation in FIG. 2. One example of product configurations using configuration patterns is taught by U.S. Pat. No. 7,188,335 with inventors Timothy P. Darr et. al., the teachings of which is hereby incorporated by reference in its entirety. This U.S. Pat. No. 7,188,335 targets the problem of properly configuring a product, rather than consolidating configurations of multiple applications into a small number of common patterns.

Applications and systems in the same or similar enterprises have similar sets of attribute vector types though the values in the attribute vectors are different. Table 1 (below) lists certain attribute vectors which are widely used in enterprise applications.

TABLE 1

Sample attribute vectors in the knowledge base

| Attribute Vector Type | Sample attributes | Description |
| --- | --- | --- |
| Deployment Vector | Software list, per-Software software type (web server, application server, database, etc.), Software name, software | the vector of which software are set up for an enterprise application |

TABLE 1-continued

Sample attribute vectors in the knowledge base

| Attribute Vector Type | Sample attributes | Description |
| --- | --- | --- |
| | variant (cluster version or not), software version, Operating system name, operating system version | |
| Configuration Vector | E.g., for Apache web server, the attributes include "Apache User", "Apache Group", "Apache non-ssl port", "Apache SSL port", "app name", "app home", "apache core variable", "application server IP", etc | the key configuration attributes of each software and their values in the enterprise applications |
| Placement Vector | Software type, Software name, machine name, other software interacting with this software instance | which machines these software are placed in, and the topology of these middleware |
| Compute Vector | Software type, Software name, Software version, CPU number, CPU type, CPU Hertz, memory size | CPU and memory of machines with different middleware |
| Storage Vector | Software type, Storage name, storage type, file system type, number of disks, per-disk sizes, total storage size | Storage assigned to machines with different middleware |
| Network Routing Vector | Software type, software name, machine name, number of network interfaces, per-network interface routing rules, gateway | network routing topology among the nodes with different middleware |
| Security Group Vector | Security group name (or ID), security group description, name of machine in the security group, name of software in the machine, software type, list of enabled ports on the machine, other firewall rules associated with the machine | assignment of machines with different middleware to different security groups, firewall specification for these machines |
| Availability Group Vector | Software type, software name, machine name, availability group name (or ID) | assignment of machines with different middleware to different availability groups |
| Load Balancing Vector | Load balancer ID, list of names of balanced machines, software type on these machines, software names on these machines | placement of load balancers between components and/or middleware of applications |
| Backup Vector | Backup solution name, backup server, backup-specific parameters (e.g. backup link bandwidth, backup frequency), list of machines which are backed up, software types on these machines, software names on these machines | the backup mechanism and algorithm for the machines with different middleware and the configuration of the backup |
| User Role and Permission Vector | Role name, the role's access privilege to each machine, the role's access privilege to each software, type of software on each machine, name of software on each machine | which type of user roles can access which machine or which software |

As illustrated in FIG. 2, the analytics methodology uses the clues of knowledge ontology to construct the attribute vectors from the enterprise-maintained documents like application specifications and build sheets. The knowledge ontology 220 captures the semantics of specific attribute vector types, structures of the entities involved in the attribute vectors, and keywords or tags associated with the attributes in the given documents 202, 204, 206, 208, 210. As these documents are usually manually written, there are free-form texts in the documents. A search of keywords and regular expression is used, as well as data mining technology, to extract values from the documents. Then encode these values into the attribute vectors and also capture the relationships between the generated vector entries according to the knowledge ontology 220.

The knowledge base 230 is accumulate for identifying common configuration and deployment patterns rather than only discover configuration of an individual machine and migrate its configuration to a new machine. For example, a feature set specific to a middleware is obtainable from the knowledge database. Previously discovery technologies are for migration, transplantation, and more at granularity of virtual machines.

The present invention represents configurations, attributes, deployments in form of a knowledge base. These include both domain knowledge and middleware-specific knowledge. In one example, multi-layer knowledge is used. Configuration and attributes are specific to a certain middleware, such as, IBM DB2, Oracle, IBM WebSphere, WebLogic, Apache, and others.

Abstract layer are used for individual types of middleware, such as database, webserver, application server, and more, that provide common knowledge across multiple middleware of the same or similar types.

In one example the present invention interacts and interprets existing model languages, such as unified modeling language (UML) and others. The present invention uses knowledge ontology to build the knowledge base from application specifications. The knowledge ontology is typically created, but it is contemplated to use existing knowledge ontologies as well. The knowledge ontology may be generic, domain specific, or middleware specific. As an optional input, can be used for additional categorization clues and information when building knowledge base. Some applications used for real-time stock trading, some for off-line analysis, and others used for staff management Moreover, user feedback 232 can be used as adjustments incorporated into configuration consolidation and building of knowledge base 242. Based on the knowledge representation, the existing technologies can be applied 244. For example, both interactive and non-interactive database query inspection technologies and machine learning technologies 244 can be applied. The machine learning can be unsupervised machine learning, such as clustering, or supervised machine learning, such as decision tree, or a combination of both.

Analytics output 250 of the system and method are either applicable to cloud design and implementation, or presented to users. Common patterns, deployments, configurations identified by the system and method are applied to cloud service catalog 272, cloud machine images/templates 274, cloud administrator orchestration/workflows 276, and other cloud design/implementation 266. Analytics results 262 in response to users' custom queries 264. Analytics results in response to users' custom queries, such as inference of configuration characteristics for same type of deployments, same type of use cases, same type of middleware, etc.

Build Configuration Analysis

Figure 3:
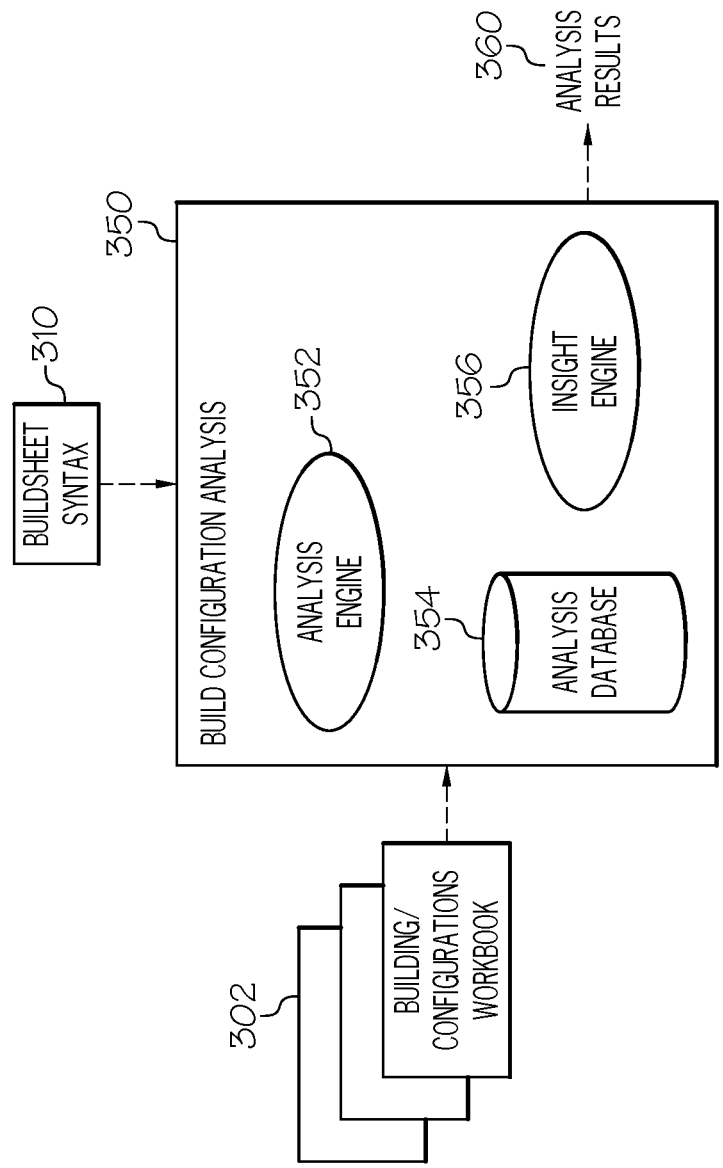
FIG. 3 is a high level functional diagram of the methodology.

FIG. 3 is a high level functional diagram of the methodology for the present invention. In this diagram shown are two inputs 302 build sheets/configuration workbooks (analogous to 202, 204, 206, 208, 210) to the build configuration analysis module 350. A build sheet syntax, such as UML, is shown 310. An analysis engine 352, analysis database 354, and insight engine 356 is shown. The analysis output 360 (is analogous to 262, 266.

Process Flow for Pattern Analysis

Figure 4:
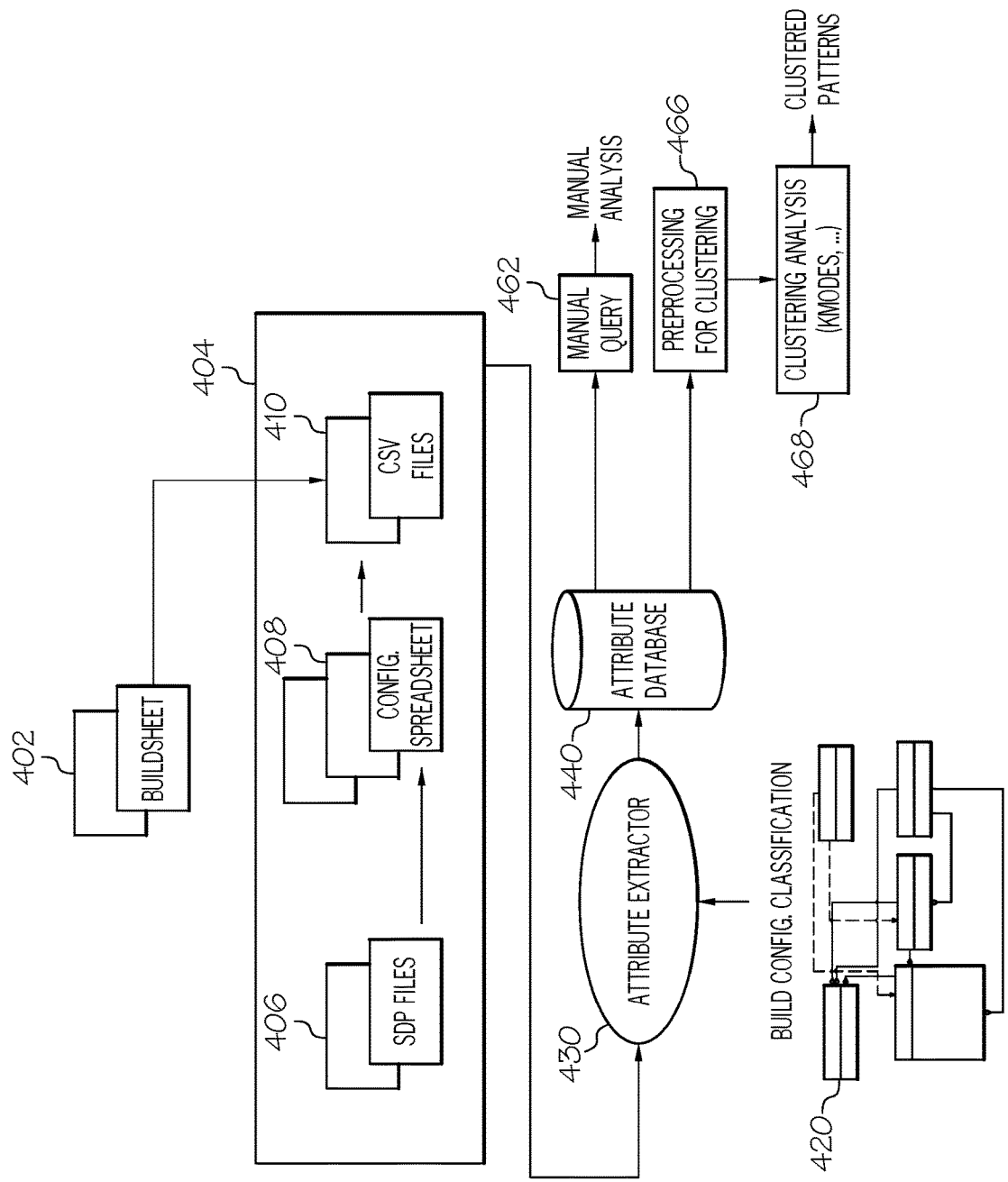
FIG. 4 is a process flow for pattern analysis.
Figure 5:
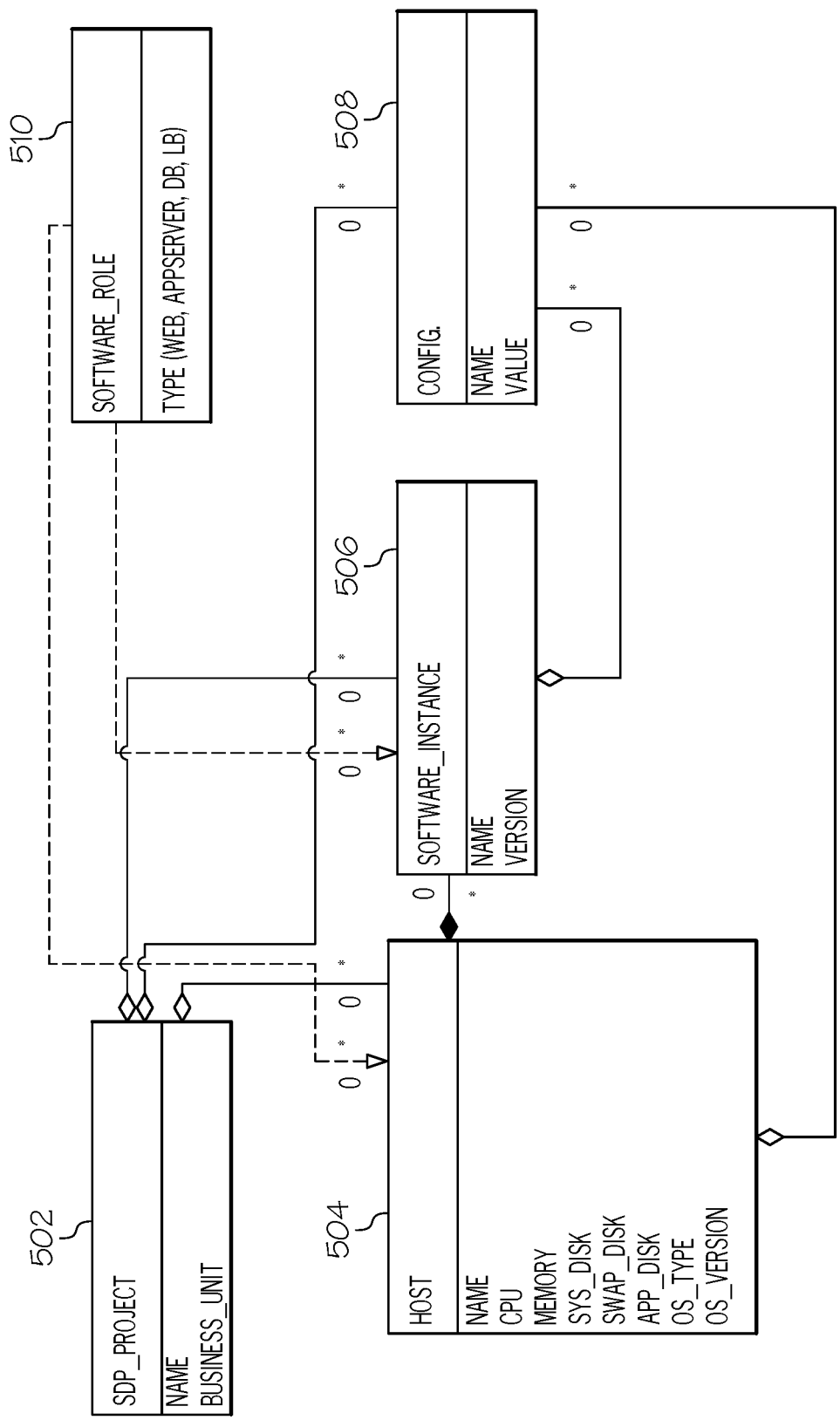
FIG. 5 is a build configuration classification/simple example piece of knowledge ontology.

FIG. 4 is a process flow for pattern analysis. In this implementation patterns are defined as logical description of physical and virtual assets as well as their configurations that comprise an enterprise application. In this diagram, as one example, a SDP 406 (Solution Design Package, a collection of application documents for an application/project, analogous to 202, 204, 206, 208, 210) is converted to a configuration file 408 and then to comma separated file (csv) 410. Build sheet inputs 304 (analogous to 202, 204, 206, 208, 210) are also preprocessed (similar to how a SDP is processed above) in step 404 to get broken into a uniform file form. An attribute extractor 430 is an example of the Analysis Engine 352. A knowledge ontology syntax 420, such as UML or FIG. 5, is shown. The attribute database 440 is shown. The analysis output 462, 466, 468 is analogous to 250, 262, 266. The clustering analysis is further described below with reference to FIG. 5 and FIG. 6.

Knowledge Ontology

FIG. 5 is an example of build configuration classification, such as a database schema or simple example piece of knowledge ontology for the types of deployment vector, configuration vector, compute vector, and storage Vector. This is a capture of the relationships between enterprise applications/projects (SDP_Project 502), virtual machines or physical machines hosting software components of the application (host), instances of installed software like database server and application server (software_instance 506), software-specific configurations for each software instance (configuration 508), and association of the software roles (software_role 510), i.e. whether the software is providing database service, application service, web service, load balancing service, firewall service or other services. The one-to-one or one-to-many associations between instances of these entities are also marked in the diagram.

Besides the high-level ontology, as shown in FIG. 5, there are also pieces of low-level and/or software-specific, attribute-vector specific ontology for extracting the relevant configurations and attributes from application documents. The knowledge ontology is manually constructed as inputs to the builder of the knowledge base and can be reused for many applications within the same enterprise as well as across a number of enterprises and organizations. A library of the knowledge ontology is implemented together with our analytics tool for our customer enterprise.

The present invention targets an automated procedure of pattern identification leveraging analytics technology when the application documents and knowledge ontology are given. However, users are also allowed to provide inputs to the building of the knowledge base if the users want, as shown in FIG. 2. These user inputs include feedback to the built knowledge base, the extra categorization information, and guide and adjustment for attribute association, etc.

In order to extract the common patterns of the enterprise applications, analytics technology are applied onto the built knowledge base, i.e. multiple attribute vectors and their values such as those listed in Table 1.

In an environment where an organization is transitioning from a non-cloud to a cloud-based application hosting environment, a wealth of data may be available from the pre-cloud environment, to which analytics can be applied, to identify the most important classes of catalog entries for which the catalog is to be designed.

The most relevant analytics approach to apply to this problem is unsupervised machine learning or clustering. The approach is unsupervised because it does not require domain experts to manually label examples (e.g., of DB2 configurations) into one of several desired classes (e.g., platinum), but instead attempts to discover the class members automatically. Various clustering algorithms which can be applied to this problem include KMeans, Hierarchical Agglomerative Clustering, and DBScan.

The common aspect of any machine learning algorithm is the input data it consumes, which consists of many instances. Each data instance, which is to be classified in this case, is represented as a feature vector in multi-dimensional space. Each feature (or dimension) of a feature vector represents a "variable" in the i'th dimension, whose value influences the position of the feature in N-dimensional space (where the feature vector is of size N), and thus influences which class it belongs to. Clustering algorithms identify class boundaries around points in multi-dimensional space.

In any given domain, the range of values a feature can assume will define it as numeric, ordinal or categorical, where the last two categories are not numbers but symbolic in nature. Ordinal features have implicit ordering (e.g., grades A, B, C, D and F), whereas categorical features do not (e.g., RED, GREEN, BLUE). While this is not imperative—there are clustering algorithms which can handle non-numeric features such as KMode—in our proposal, we convert ordinal and categorical attributes to numeric/binary 0/1 variables. Therefore, a feature such as "grade" with possible values <A, B, C, D, F> is converted into five numeric features "A", "B", etc., each of which is set to 0 or 1 for any given input data instance.

The following is an example of three numeric features in a DB2 configuration which could be part of a feature vector used to cluster DB2 configurations: (1) Application support layer heap size (4 KB) (ASLHEAPSZ), (2) Max requester I/O block size (bytes) (RQRIOBLK), and (3) Workload impact by throttled utilities (UTIL_IMPACT_LIM). When feature values are numeric, a common approach is to standardize and normalize each feature (a column of the matrix of different feature vectors) so that the range of values in each dimension has mean 0 and standard deviation of 1. This enables distance measure calculations in N-dimensional space to not be impacted by the range of values in one dimension being much larger than in other dimension.

Clustering algorithms such as KMeans and hierarchical clustering require as one of the inputs the number of clusters. If the goal is to define catalog entries with a known cardinality, e.g., four for DB2 if the desired classes are Platinum through Bronze, then this is not an issue. However, a different approach could be adopted where the core algorithm is run with different number of clusters, and a "goodness" measure for each output—such as within-cluster-sum-of-squares can be applied to find the optimal number of clusters given the input data. The pamk function in R for example simplifies application of this approach.

Spectral or density-based clustering algorithms, of which DBScan is an example, does not require the number of clusters to be specified as an input before running the algorithm. However, two other input parameters are required by DBScan, the minimum number of points (minPts) in a cluster before it is declared as such, and a distance metric (eps) that determines when neighboring points in N-dimensional space can be identified as belonging to the same epsilon-neighborhood when the algorithm is run on the input data points. For the task of identifying classes for cloud catalog entries, the KMeans class of algorithms may be more directly applicable to the task when the desired number of classes is known. However, the use of DBScan with various values of minPts and eps until the number of clusters matches the desired value may yield additional insights about the input data, such as the presence of clear outliers (a very unusual and one-off DB2 configuration) that should be discarded prior to (re)clustering.

Implementation

Figure 6:
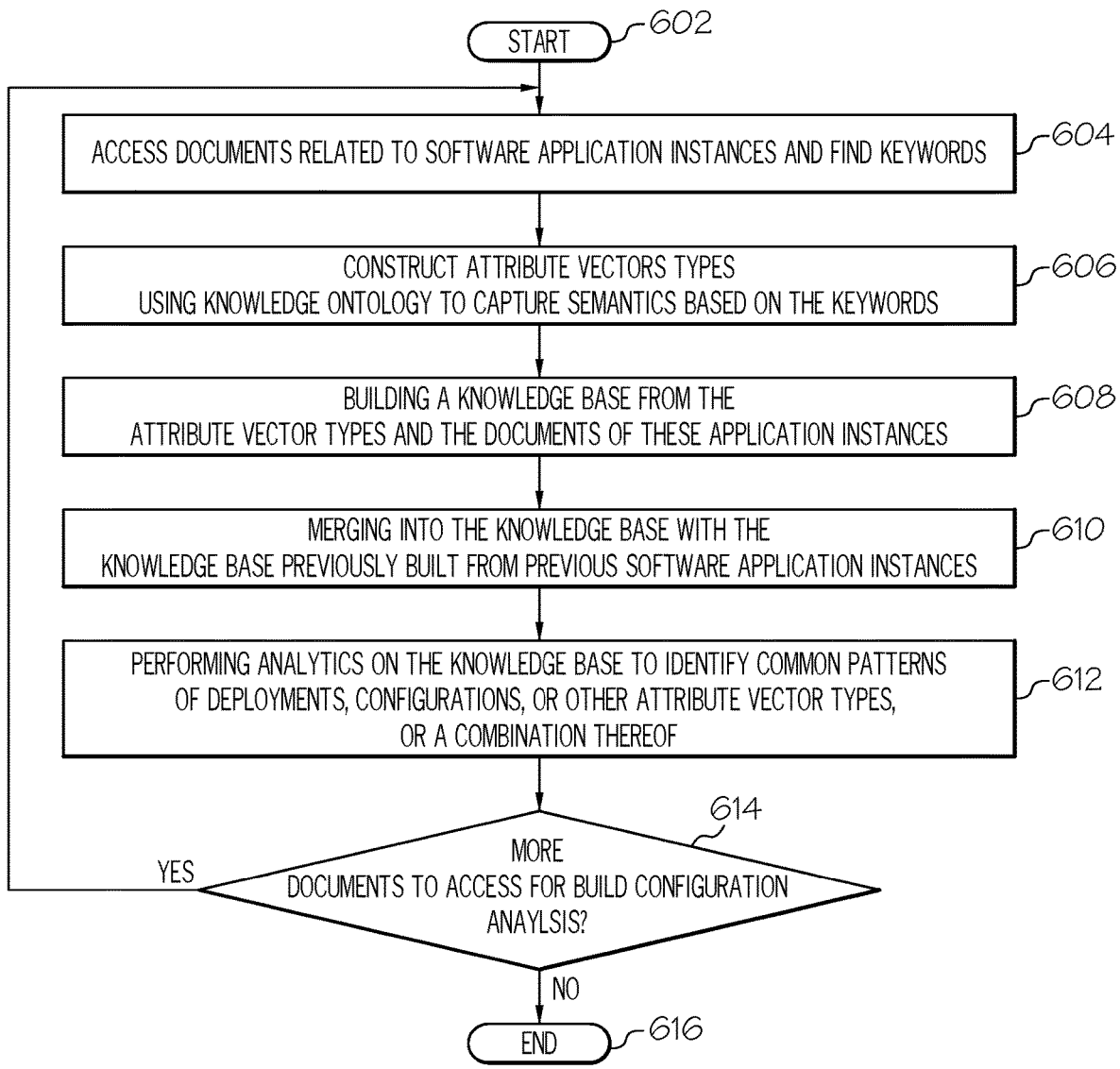
FIG. 6 is example flow diagram of the overall process.

FIG. 6 is example flow diagram of the overall process. The process begins in step 602 and immediately proceeds to step 604 in which documents are accessed related to at least a portion of these software application instances. The software application instances in one example are previously deployed to a hosted environment.

Next, in step 606, different attribute vector types are constructed using a knowledge ontology to capture semantics based on keywords associated with resource attributes derived from the documents. The knowledge ontology may be a structure of a computing entity involved with the attribute vector. In one example, the attribute vectors can be constructed using at least one of Analytics for Logical Dependency Mapping (ALDM), Darwin Information Typing Architecture (DITA), or a combination thereof. The knowledge ontology includes using the knowledge ontology that is one of generic, domain specific, or middleware specific.

The attribute vectors may be from wherein the constructing the plurality of different attribute vectors types further includes selecting at least one essential attribute vectors type of a deployment vector; a configuration vector; a placement vector; a compute vector; a storage vector; or a combination thereof. In another example, the attribute vectors types further includes selecting at least one desirable vector type of a network routing vector; a security group vector; an availability group vector a load balancing vectors; a backup vectors; a user role and permission vector; or a combination thereof.

A knowledge base is built from the attribute vectors types and the documents of these application instances in step 608. In step 610, the knowledge base is merged with a knowledge base built from previously software application instances. The building the knowledge base may include using unified modeling language (UML).

In step 612, analytics is performed on the knowledge base to identify at least one common pattern of deployment, configuration, or other attribute vector types, or a combination thereof. The analytics may be performed using a variety of techniques including database query technique, machine learning techniques, and clustering techniques. The common set of patterns may be used to identify what deployments, configurations, and/or other attribute vectors the application instances will be in after they are migrated from an enterprise environment to a hosted environment. These may be applied to a service catalog, a cloud machine image, cloud workflow, and cloud design implementation. In another example, the common set of patterns are applied to one of cloud service catalog, cloud machine images, cloud workflows, and cloud design implementations. In another example, the common set of patterns are used to identify small number of application instances the application instances can be consolidated into.

The common patterns of deployments, configurations, or other attribute vector types configurations may include both domain knowledge and middleware-specific knowledge. Also, the common patterns of deployments, configurations, or other attribute vector type configurations include multi-layer knowledge in which configurations and attributes are specific to middleware and an abstract layer for individual types of middleware.

A test is made in step 614 to determine if further documents to access for build configuration analysis are available. In the case in which more documents are available, the process looks back to step 604. Otherwise, the process flow ends in step 616 as shown.

Generalized Computing Environment

Figure 7:
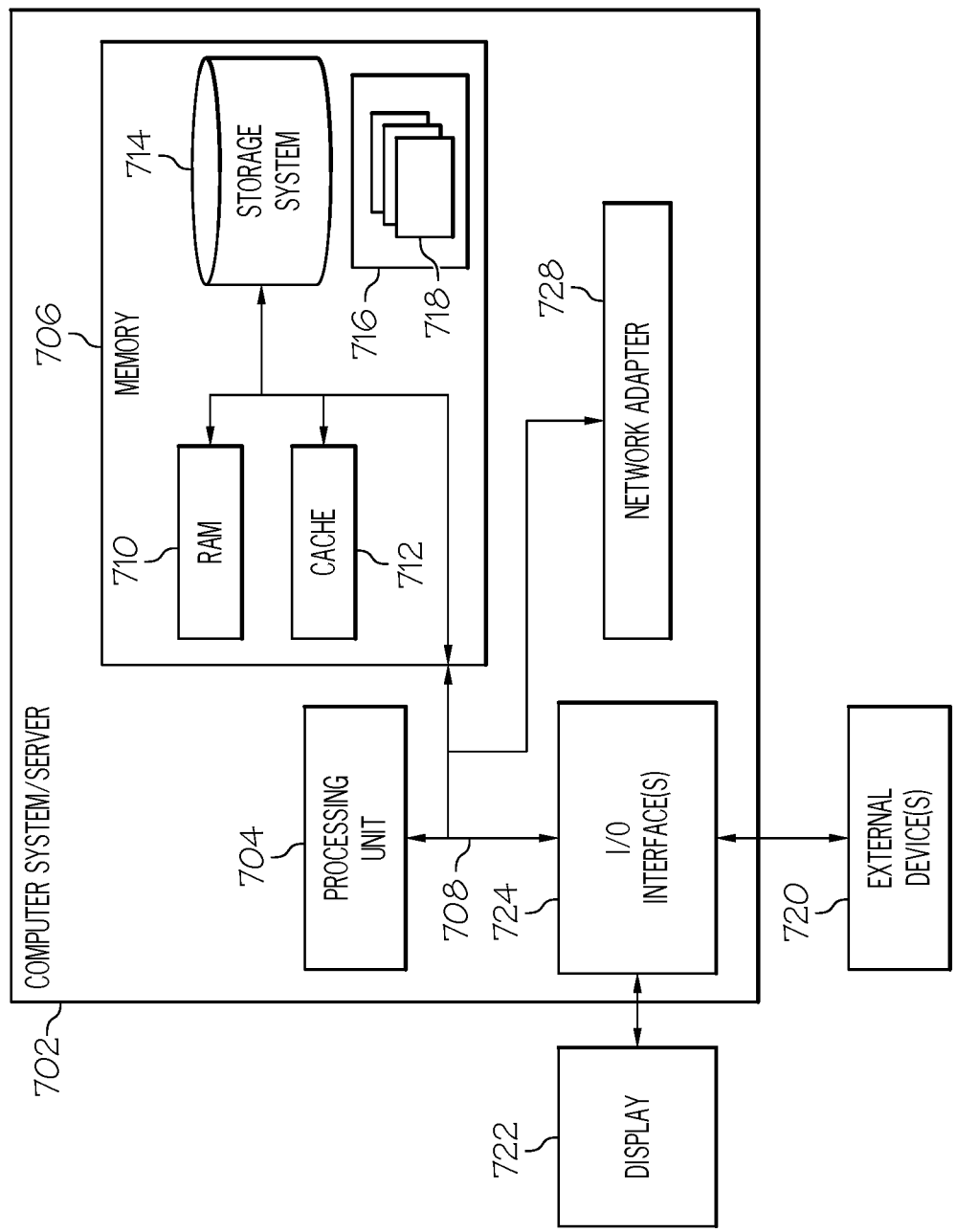
FIG. 7 illustrates one example of a server computing node according to one example of the present invention.

FIG. 7 illustrates one example of a processing node 700 for identifying patterns of a set of software applications instances from their documents as described in FIGS. 2, 3, 4, and 7 as described above and is not intended to suggest any limitation as to the scope of use or functionality of embodiments of the invention described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in computing node 700 is shown in the form of a general-purpose computing device. The components of computer system/server 702 may include, but are not limited to, one or more processors or processing units 704, a system memory 706, and a bus 708 that couples various system components including system memory 706 to processor 704.

Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706, in one embodiment, implements the diagrams of FIGS. 2, 3, 4, and the flow chart of FIG. 7. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of various embodiments of the invention.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 702 may also communicate with one or more external devices 1020 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Non-Limiting Examples

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for identifying a set of top-k plans based on the quality of each plan in a set of plans and, amongst the identified set of top-k plans, identifying one or more clusters, i.e. top-m clusters, from the set of top-k plans. In particular, the illustrative embodiments identify a set of k distinct plans with a lowest cost, where the k distinction plan includes both optimal plans and near-optimal plans, depending on k, and, by definition, for each plan in this set all valid plans of lower cost must also be in the set. The top-k plans are then ranked based on each plans associated quality, i.e. the cost associated with the plan, where the lowest cost identifies the highest quality. The top-k plans are then grouped using clustering techniques into top-m clusters, with a representative set of each cluster being presented with an option of viewing all plans within that cluster.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying patterns of a set of two or more software applications instances from their documents, the method comprises:

constructing, by a processor, a plurality of different attribute vector types using a knowledge ontology to capture semantics based on keywords associated with resource attributes derived from one or more software application enterprise-maintained documents describing at least a portion of the-set of two or more software application instances, and the different attribute vector types are one of deployment vectors, configuration vectors, and other attribute vector types;

building a knowledge base from the plurality of different attribute vector types and the software application enterprise-maintained documents of these application instances;

merging into the knowledge base with a previously knowledge base built from previous software application instances;

performing analytics on the knowledge base to identify common patterns of at least one of deployment vectors, configuration vectors, other attribute vector types, or a combination thereof; and as a result of performing analytics on the knowledge base to identify common patterns of at least one of deployment vectors, configuration vectors, other attribute vectors, or a combination thereof, designing a service catalog and machine images to migrate the set of two or more software application instances to a hosted environment.

2. The method of claim 1, wherein the constructing, by a processor, a plurality of different attribute vectors types includes using at least one of Analytics for Logical Dependency Mapping (ALDM), Darwin Information Typing Architecture (DITA), or a combination thereof.

3. The method of claim 1, wherein the constructing, by a processor, a plurality of different attribute vectors types includes using one or more software application enterprise-maintained documents describing at least a portion of a software application that have been previously deployed to a hosted environment.

4. The method of claim 1, wherein the performing analytics includes performing analytics with database query inspection technique.

5. The method of claim 1, wherein the performing analytics includes performing analytics with machine learning techniques.

6. The method of claim 1, wherein the performing analytics includes performing analytics with clustering techniques.

7. The method of claim 1, wherein the constructing the plurality of different attribute vector types further includes using the knowledge ontology to capture a structure of a computing entity involved with at least one of the plurality of different attribute vector types.

8. The method of claim 1, wherein the constructing the plurality of different attribute vectors types further includes selecting at least one attribute vectors type of:
a deployment vector;
a configuration vector;
a placement vector;
a compute vector;
a storage vector; or
a combination thereof.

9. The method of claim 1, wherein the constructing the plurality of different attribute vectors types further includes selecting at least one attribute vectors type of:
a network routing vector;
a security group vector;
an availability group vector
a load balancing vectors;
a backup vectors;
a user role and permission vector; or
a combination thereof.

10. The method of claim 1, wherein the common patterns are used to identify what deployments, configurations, and/or other attribute vectors the software application instances will be in after they are to migrated from an enterprise environment to a hosted environment.

11. The method of claim 10, wherein the common patterns are applied to one of cloud service catalog, cloud machine images, cloud workflows, and cloud design implementations.

12. The method of claim 1, wherein the common patterns are used to identify small number of application instances the software application instances can be consolidated into.

13. The method of claim 1, wherein the common patterns of at least one of deployment vectors, configuration vectors, or other attribute vector types include both domain knowledge and middleware-specific knowledge.

14. The method of claim 1, wherein the common patterns of at least one of deployment vectors, configuration vectors, or other attribute vector types include multi-layer knowledge in which configurations and attributes are specific to middleware and an abstract layer for individual types of middleware.

15. The method of claim 1, wherein the building the knowledge base from the plurality of different attribute vector types and the software application enterprise-maintained documents of these application instances includes using unified modeling language (UML).

16. The method of claim 1, wherein the constructing, by the processor, the plurality of different attribute vector types using the knowledge ontology includes using the knowledge ontology that is one of generic, domain specific, or middleware specific.

17. An apparatus comprising:
a processor; and
a memory coupled to the processor, wherein the memory comprises instructions which, when executed by the processor, cause the processor to perform:
constructing, by a processor, a plurality of different attribute vector types using a knowledge ontology to capture semantics based on keywords associated with resource attributes derived from one or more software application enterprise-maintained documents describing at least a portion of a set of two or more software application instances, and the different attribute vector types are one of deployment vectors, configuration vectors, and other attribute vector types;
building a knowledge base from the plurality of different attribute vector types and the software application enterprise-maintained documents of these application instances;
merging into the knowledge base with a previously knowledge base built from previous software application instances;
performing analytics on the knowledge base to identify common patterns of at least one of deployment vectors, configuration vectors, other attribute vector types, or a combination thereof; and
as a result of performing analytics on the knowledge base to identify common patterns of at least one of deployment vectors, configuration vectors, other attribute vectors, or a combination thereof, designing a service catalog and machine images to migrate the set of two or more software application instances to a hosted environment.

18. The apparatus of claim 17, wherein the constructing, by a processor, a plurality of different attribute vectors types includes using at least one of Analytics for Logical Dependency Mapping (ALDM), Darwin Information Typing Architecture (DITA), or a combination thereof.

19. The apparatus of claim 17, wherein the constructing, by a processor, a plurality of different attribute vectors types includes using one or more software application enterprise-maintained documents describing at least a portion of a software application that have been previously deployed to a hosted environment.

20. A computer program product for identifying patterns of a set of two or more software applications instances from their documents comprising a computer readable storage medium having a computer readable program stored therein, wherein the computer readable program, when executed on a computing device, causes the computing device to perform:

accessing, by a processor, a description of a domain model that incorporates both behavior and data;

constructing, by a processor, a plurality of different attribute vector types using a knowledge ontology to capture semantics based on keywords associated with resource attributes derived from one or more software application enterprise-maintained documents describing at least a portion of the-set of two or more software application instances, and the different attribute vector types are one of deployment vectors, configuration vectors, and other attribute vector types;

building a knowledge base from the plurality of different attribute vector types and the software application enterprise-maintained documents of these application instances;

merging into the knowledge base with a previously knowledge base built from previous software application instances;

performing analytics on the knowledge base to identify common patterns of at least one of deployment vectors, configuration vectors, other attribute vector types, or a combination thereof; and as a result of performing analytics on the knowledge base to identify common patterns of at least one of deployment vectors, configuration vectors, other attribute vectors, or a combination thereof, designing a service catalog and machine images to migrate the set of two or more software application instances to a hosted environment.

* * * * *